United States Patent
Chang

(10) Patent No.: US 9,731,432 B1
(45) Date of Patent: Aug. 15, 2017

(54) RIP FENCE WITH LOCKING DEVICE

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 10 days.

(21) Appl. No.: 15/082,521

(22) Filed: Mar. 28, 2016

(51) Int. Cl.
*B27B 27/10* (2006.01)
*B27B 27/02* (2006.01)
*B23D 47/02* (2006.01)

(52) U.S. Cl.
CPC ............ *B27B 27/10* (2013.01); *B23D 47/025* (2013.01); *B27B 27/02* (2013.01)

(58) Field of Classification Search
CPC ........ B27B 27/10; B27B 27/02; B23D 47/025
See application file for complete search history.

(56) References Cited

U.S. PATENT DOCUMENTS

| | | | | |
|---|---|---|---|---|
| 4,611,823 A * | 9/1986 | Haas | ...................... | F16M 11/42 108/119 |
| 5,078,373 A * | 1/1992 | Miller | ..................... | B27B 27/02 269/303 |
| 5,293,802 A * | 3/1994 | Shiotani | ............... | B23D 47/025 269/318 |
| D404,404 S * | 1/1999 | Lane | .................... | B23D 47/025 D15/133 |
| 6,360,641 B1 * | 3/2002 | Talesky | ................... | B27B 27/02 83/438 |
| 7,174,820 B2 * | 2/2007 | Huang | .................... | B27B 27/02 144/287 |
| 7,201,090 B2 * | 4/2007 | Svetlik | ................. | B23D 45/044 83/471.3 |
| 7,444,913 B2 * | 11/2008 | Shibata | .................... | B27B 27/02 144/253.1 |
| 7,614,330 B2 * | 11/2009 | Griswold | ............... | B23Q 3/007 33/706 |
| 7,707,920 B2 * | 5/2010 | Gass | ..................... | B23D 45/067 83/471.1 |
| 8,240,237 B2 * | 8/2012 | Frolov | ..................... | B26D 7/01 83/446 |
| 8,312,799 B2 * | 11/2012 | Frolov | .................... | B27B 27/02 144/287 |
| 8,915,172 B1 * | 12/2014 | Hood | ...................... | B27B 27/02 83/446 |
| 9,259,850 B2 * | 2/2016 | Hendrickson | ........... | B27B 27/02 |
| 9,327,355 B2 * | 5/2016 | Struss | .................. | B23D 47/025 |
| 9,592,623 B2 * | 3/2017 | Frolov | .................... | B27B 27/08 |
| 2010/0122615 A1 * | 5/2010 | Janson | .................... | B27B 27/10 83/438 |
| 2011/0061508 A1 * | 3/2011 | Scherl | ..................... | B27B 27/02 83/438 |

* cited by examiner

*Primary Examiner* — Sean Michalski

(57) ABSTRACT

A moveable rip fence of a table saw includes a housing including an elongated opening on a top, a seat secured to an underside of top of the housing, the seat having a lower through hole, and a stop member across two sides of the housing, a lever pivotably fastened in the elongated opening; a link pivotably interconnecting the lever and a spring biased rod, an inverted L-shaped limit member secured across two sides of the housing; a clamping member having a top secured by a support member and including an intermediate hole member and a projecting base member; and a locking member including a lower wedge member fastened on the base member, and a flexible inclined member on a top. The lever is flush with the top of the housing in a locked position. A pressing of a rear portion of the lever unlocks the rip fence.

6 Claims, 12 Drawing Sheets

RIP FENCE WITH LOCKING DEVICE

BACKGROUND OF THE INVENTION

1. Field of the Invention

The invention relates to a rip fence for use with a table saw and, in particular, to a rip fence having a locking device for locking the rip fence in an inoperative position.

2. Description of Related Art

Table saw is a woodworking tool consisting of a circular saw blade, mounted on an arbor which is driven by an electric motor. The blade protrudes through the surface of a table, which provides support for the material (e.g., wood) being cut.

U.S. Pat. No. 9,095,989 entitled "Rip fence with locking mechanisms" discloses a table saw having a movable rip fence, the table saw comprising a base including an upper cutting surface through which a blade extends; a front rail and a rear rail disposed on a front edge and a rear edge of the upper cutting surface respectively; and an adjustment wheel mounted on a front surface of the base; wherein the rip fence comprises an elongated casing having a front end and a rear end; a front clamping mechanism connected to the front end of the casing and including a frame, a lever pivotably secured to the frame to be pivotal between a locked position and a released position, the lever having an internal cam member, a clamping member pivotably secured to the lever, the clamping member having a hook at an open end, a spring biased shaft, and a C-clip for retaining an inner end of the shaft in the frame; and a rear clamping mechanism connected to the rear end of the casing and including a frame, a lever pivotably secured to the frame to be pivotal between the locked position and the released position, and a clamping member pivotably secured to the lever, the clamping member having a hook at an open end; wherein for the front clamping mechanism in the released position of the rip fence, the shaft engages the cam member; and a pivotal movement of both the lever and the clamping member causes the cam member to push the shaft inward until an inner end of the shaft is stopped by the frame, the hook is secured to a bottom of the rear rail, the lever is about oriented downward, the shaft is pushed outward to urge against the cam member, and the shaft is disengaged from the frame at the end of the pivotal movement; and wherein for the rear clamping mechanism a pivotal movement of both the lever and the clamping member from the released position of the rip fence causes the hook to secure to a bottom of the rear rail and causes the lever to be oriented about downward, thereby locking the rear clamping mechanism.

On drawback of the patent is that lever 42 of clamping mechanism 40 and lever 62 of clamping mechanism 60 are projected out of front and rear ends of the fence 20 and it may interfere with operation of the table saw.

Thus, the need for improvement still exists.

SUMMARY OF THE INVENTION

It is therefore one object of the invention to provide a table saw comprising a base including an upper cutting surface through which a blade extends; a folding leg assembly for supporting the base; a rip fence slidably mounted on the cutting surface; a front rail mounted on a front end of the upper cutting surface; and a sliding member slidably mounted on the front rail and secured to a bottom of a front end of the rip fence; wherein the rip fence comprises a housing including an elongated opening on a top adjacent to a front end, a seat secured to an underside of the top of the housing, the seat having a lower through hole, a stop member disposed across two sides of the housing, the stop member having a central through hole, and two opposite slots at a rear end of the housing; a lever pivotably secured to the housing and disposed in the elongated opening; a link having a front end pivotably secured to a front end of the lever; a rod having a front end pivotably secured to a rear end of the link, the rod including external threads at a rear end, the rod passing through the through hole of the stop member; an inverted L-shaped limit member secured across two sides of the housing, the limit member being in close proximity to an outer surface of a rear end of the cutting surface; a support member positioned across the slots and including a rectangular recess on a rear end; a clamping member including two opposite upper cavities secured to the recess, an intermediate hole member, and a base member projecting out a bottom of the clamping member and being perpendicular thereto wherein the rod further passes through the hole member to have the external threads fastened by a fastener, thereby securing the rod to the clamping member; a locking member including a lower wedge member rested on the base member, and a flexible inclined member on a top wherein the locking member is secured to the clamping member; and a biasing member put on a portion of the rod between the hole member and the stop member and compressed therebetween; wherein in a locked position the lever is flush with the top of the housing, a bottom of the rear end of the cutting surface is urged against the wedge member, the inclined member is bent to urge against the outer surface of the rear end of the cutting surface, the biasing member is further compressed, and the clamping member is disposed in a position about perpendicular to the rod; wherein a pressing of a rear portion of the lever causes the lever to pivot in a first direction so as to move the rod rearward to expand the biasing member, push the clamping member rearward, disengage the inclined member from the rear end of the cutting surface, and disengage the wedge member from the bottom of the rear end of the cutting surface, thereby unlocking the rip fence; and wherein a pressing of a front portion of the lever causes the lever to pivot in a second direction so as to return the lever to the locked position.

The above and other objects, features and advantages of the invention will become apparent from the following detailed description taken with the accompanying drawings.

DETAILED DESCRIPTION OF THE INVENTION

Figure 1:
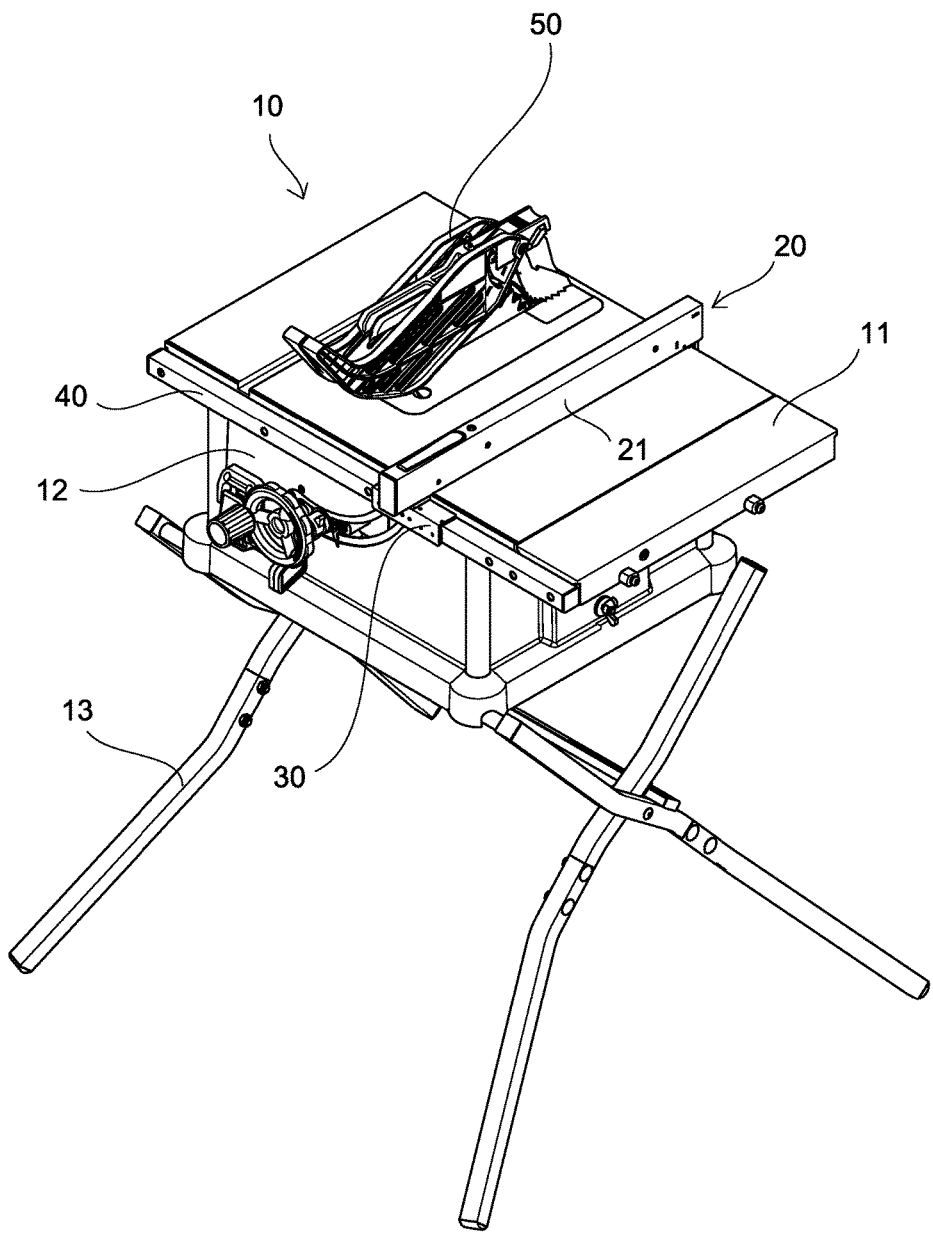
FIG. 1 is a perspective view of a table saw according to a preferred embodiment of the invention, the table saw incorporating a rip fence made in accordance with the principles of the invention being disposed on an upper cutting surface of the table saw.
Figure 2:
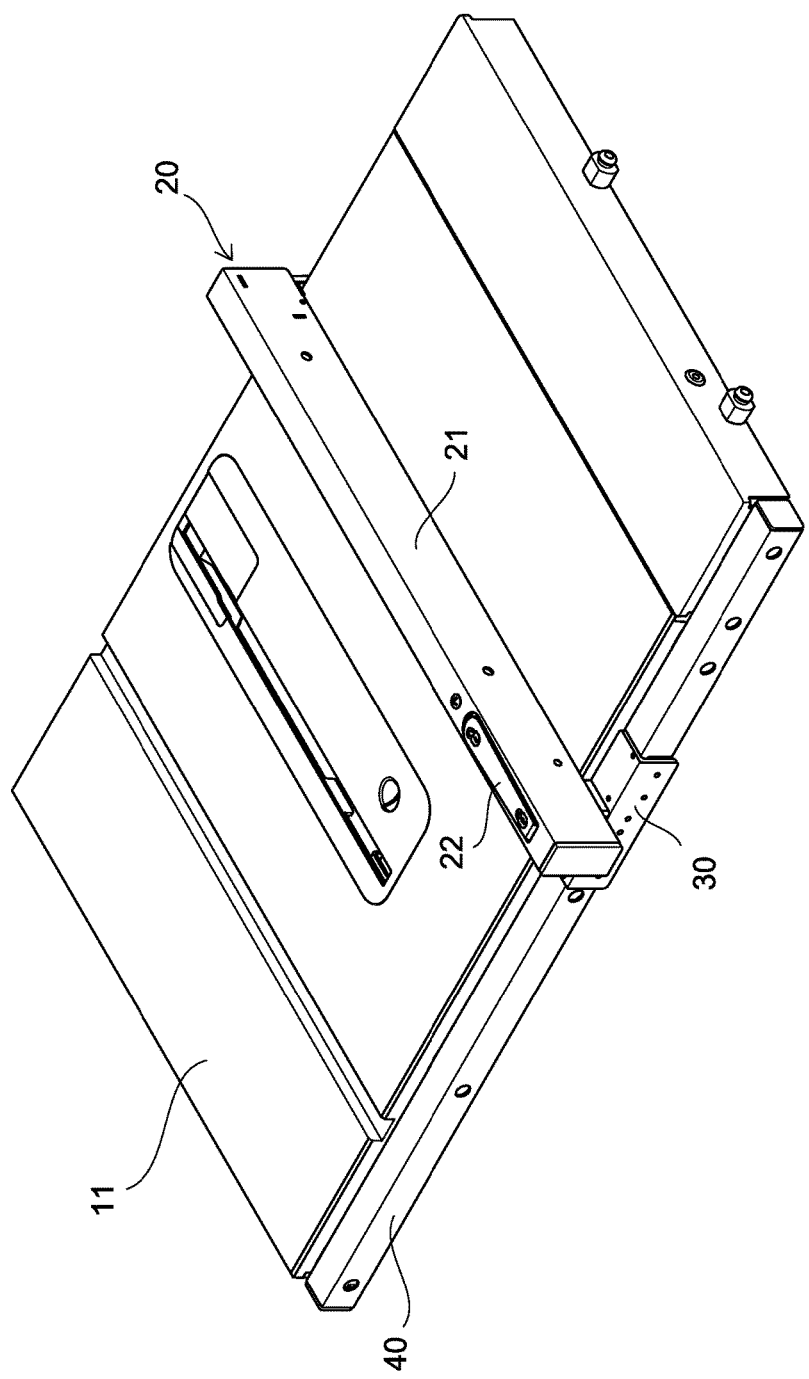
FIG. 2 is a perspective view of the rip fence and the cutting surface of the table saw with the circular saw blade removed and the rip fence being locked by the lever.

Referring to FIGS. 1 to 10, a table saw 10 in accordance with a preferred embodiment of the invention is shown and comprises a base 12, a folding leg assembly 13 for supporting the base 12, an upper cutting surface 11 mounted on the base 12 and having a front end 111 and a rear end 112, a rip fence 20 on the cutting surface 11, a hollow front rail 40 mounted on a front edge of the upper cutting surface 11, a sliding member 30 slidably mounted on the front rail 40 and secured to a bottom of a front end of the rip fence 20, and a circular saw blade 50 extending upward from the cutting surface 11 to be adapted to cut a substance, e.g., wood.

The rip fence 20 comprises an elongated housing 21 including an elongated top opening 211 adjacent to a front end, a cap 212 releasably secured to the front end of the housing 21, a seat 213 secured to an underside of the top of the housing 21 at an inner end of the opening 211, the seat 213 having a first hole 2131 through a lower portion, a rectangular stop member 214 disposed across two opposite second holes 219 adjacent to a rear end of the housing 21, the stop member 214 having a third hole 2141 through a center, a fastening member 215 having a fourth hole 2151 through a center, two opposite fifth holes 216 adjacent to the front end of the housing 21, two opposite sixth holes 217 adjacent to the second holes 219, and two opposite slots 218 at the rear end of the housing 21.

The rip fence 20 further comprises a lever 22 including a first through hole 221 on a bottom and a second through hole 222 on the bottom and spaced from the first through hole 221; a curved link 23 including a first hole 231 at a front end and a second hole 232 at a rear end; a pin 2211 driven through the first through hole 221 and the first hole 231 to pivotably fasten the link 23 and the lever 22 together; a pin 2221 driven through the fifth holes 216 and the second through hole 22 to pivotably fasten the housing 21 and the lever 22 together; a rod 24 including a through hole 241 at a slotted front end and external threads 242 at a rear end wherein the rod 24 passes through the third hole 2141 of the stop member 214; and a pin 2231 driven through the through hole 241 and the second hole 232 to pivotably fasten the link 23 and the rod 24 together.

The rip fence 20 further comprises an inverted L-shaped limit member 27 including a vertical part 271 in close proximity to the rear end 112, a through hole 272 in a horizontal part, and a pin 2721 driven through the sixth holes 217 and the through hole 272 to fasten the housing 21 and the limit member 27 together; a plate shaped support member 26 positioned across the slots 218 and including a rectangular recess 261 on a rear edge; and an clamping member 25 including an upper hole 253, two opposite cavities 255 adjacent to the hole 253 and engaged the recess 261, a hole member 252 through a main portion of the clamping member 25, a hole element 251 through the main portion of the clamping member 25 and below the hole member 252, and a base member 254 projecting out of the hole member 252 the main portion of the clamping member 25 and being perpendicular thereto wherein the rod 24 further passes through the hole member 252 to have its external threads 241 fastened by a nut 243, thereby securing the rod 24 to the clamping member 25. A fastener 256 is driven through the fourth hole 2151 of the fastening member 215 to fasten the clamping member 25 and the support member 26 together.

The rip fence 20 further comprises a locking member 28 disposed on a lower portion of the clamping member 25, the locking member 28 including a lower wedge member 281 rested on the base member 254, a flexible inclined member 282 on a top, and an upper hole 283; and a torsion spring 29 put on a section of the rod 24 between the hole member 252 and the stop member 214. A fastener (not numbered) is driven through the hole 283 into the hole element 251 to fasten the locking member 28 and the clamping member 25 together.

The hollow rail 40 has a rectangular longitudinal section and includes a top 42, a bottom 43, and two sides 41. The sliding member 30 has an inverted L-shaped longitudinal section and includes a vertical part 31, a horizontal part 32 in close proximity to the top 42 of the rail 40, a spacer member 33 secured to an inner surface of the vertical part 31 and in close proximity to the front one of the sides 41, the spacer member 33 having a protuberance 331 engaged a corner of the bottom 43 of the rail 40. A distance between the vertical part 271 of the limit member 27 and the spacer member 33 is slightly greater than that between the rear end 112 of the cutting surface 11 and the front one of the sides 41 so that the rip fence 20 may slide smoothly in an unlocked position.

Figure 9:
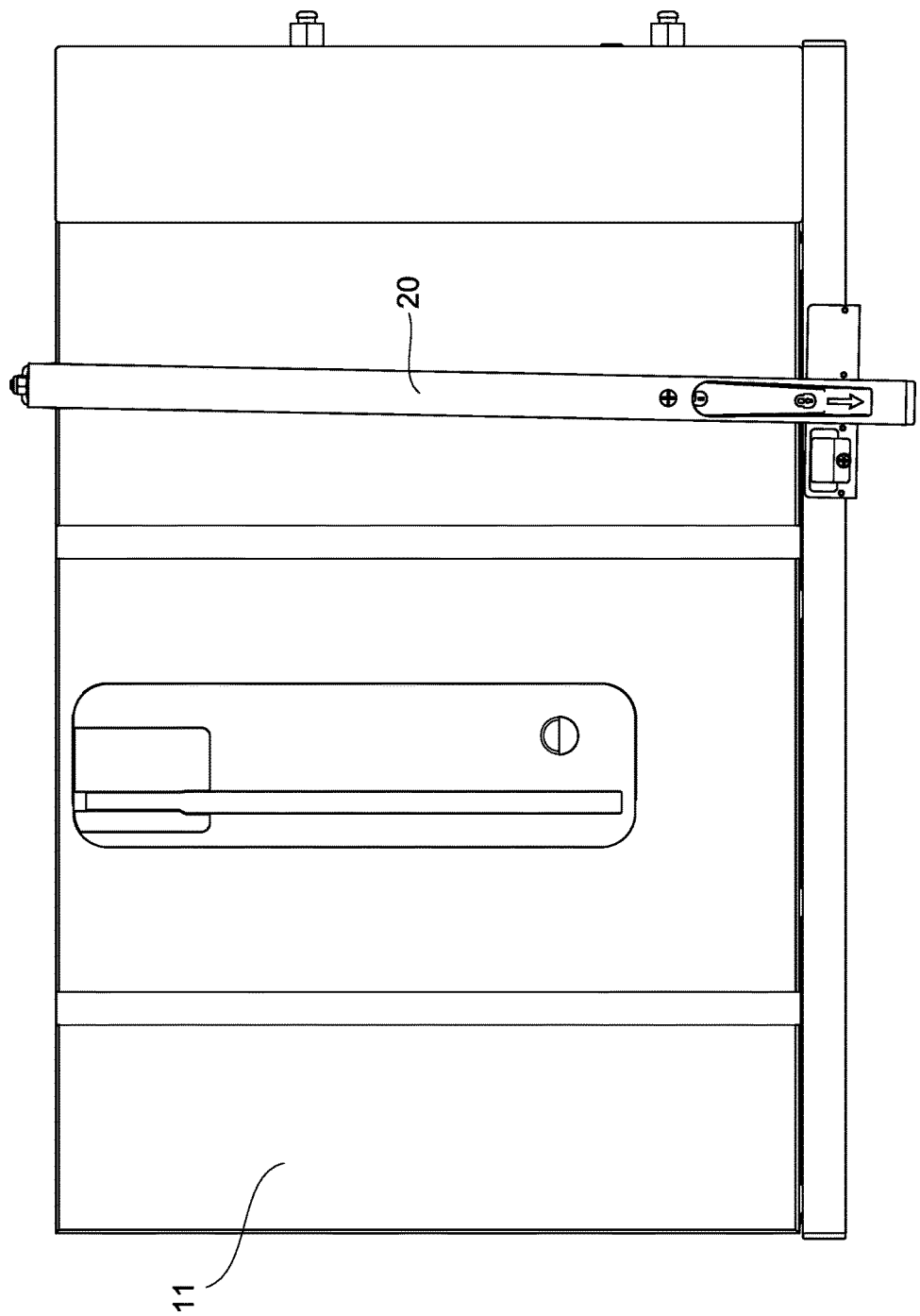
FIG. 9 is a top view of the cutting surface and the rip fence of FIG. 3, the rip fence being unlocked, not flush with the cutting surface, and not perpendicular to the front rail.
Figure 10:
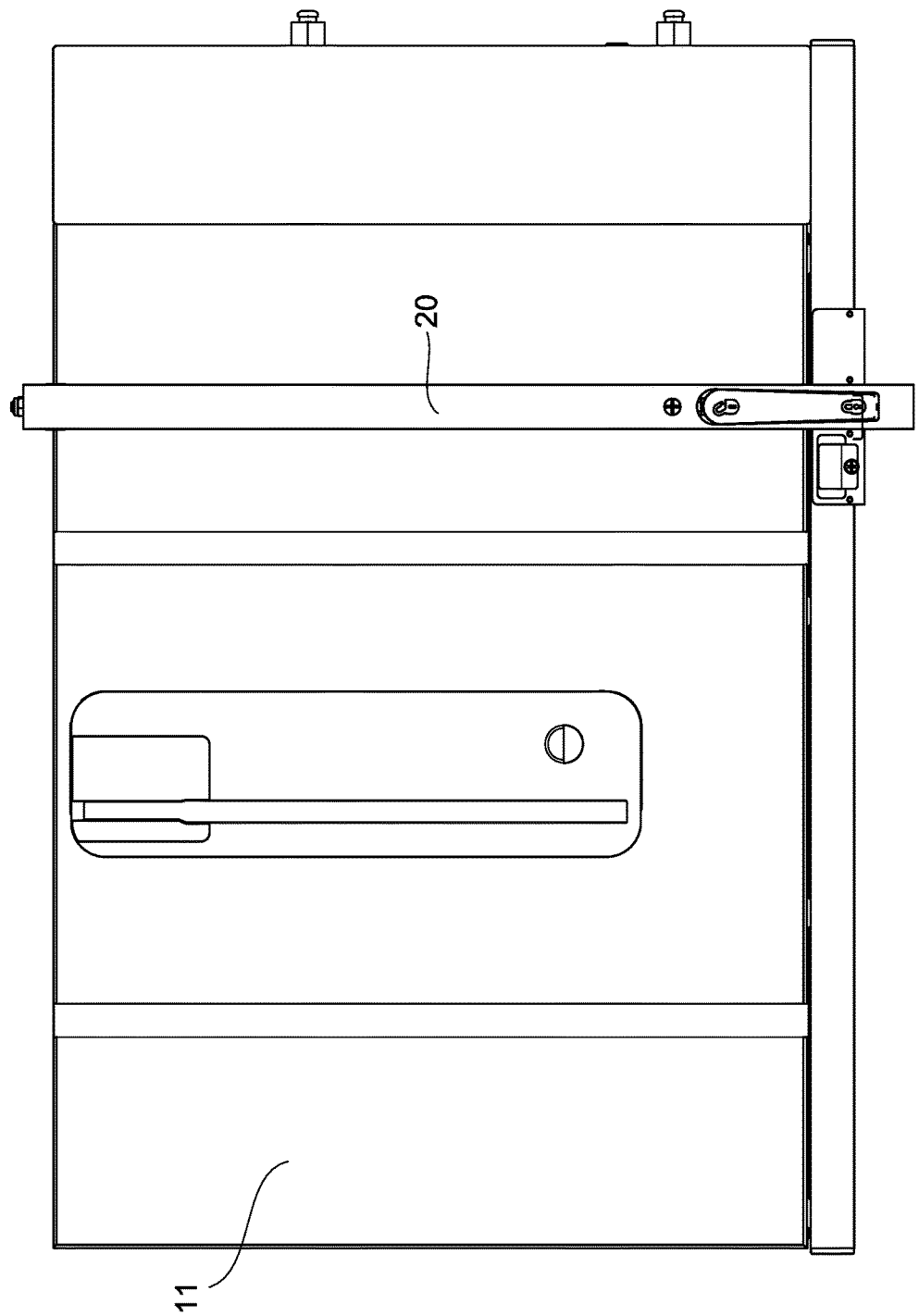
FIG. 10 is a view similar to FIG. 9, the rip fence being locked and perpendicular to the front rail.

As shown in FIGS. 1, 2, 8 and 8a, in a locked position the lever 22 is flush with the top of the housing 21, the bottom of the rear end 112 of the cutting surface 11 is urged against the wedge member 281, the inclined member 282 is bent to urge against an outer surface of the rear end 112 of the cutting surface 11, the torsion spring 29 is further compressed, and the clamping member 25 is disposed in a position about perpendicular to the rod 24. As shown in FIG. 9, the rip fence 20 is unlocked, not flush with the cutting surface 11, and not perpendicular to the front rail 40. To the contrary, as shown in FIG. 10, the rip fence 20 is locked and perpendicular to the front rail 40.

Figure 3:
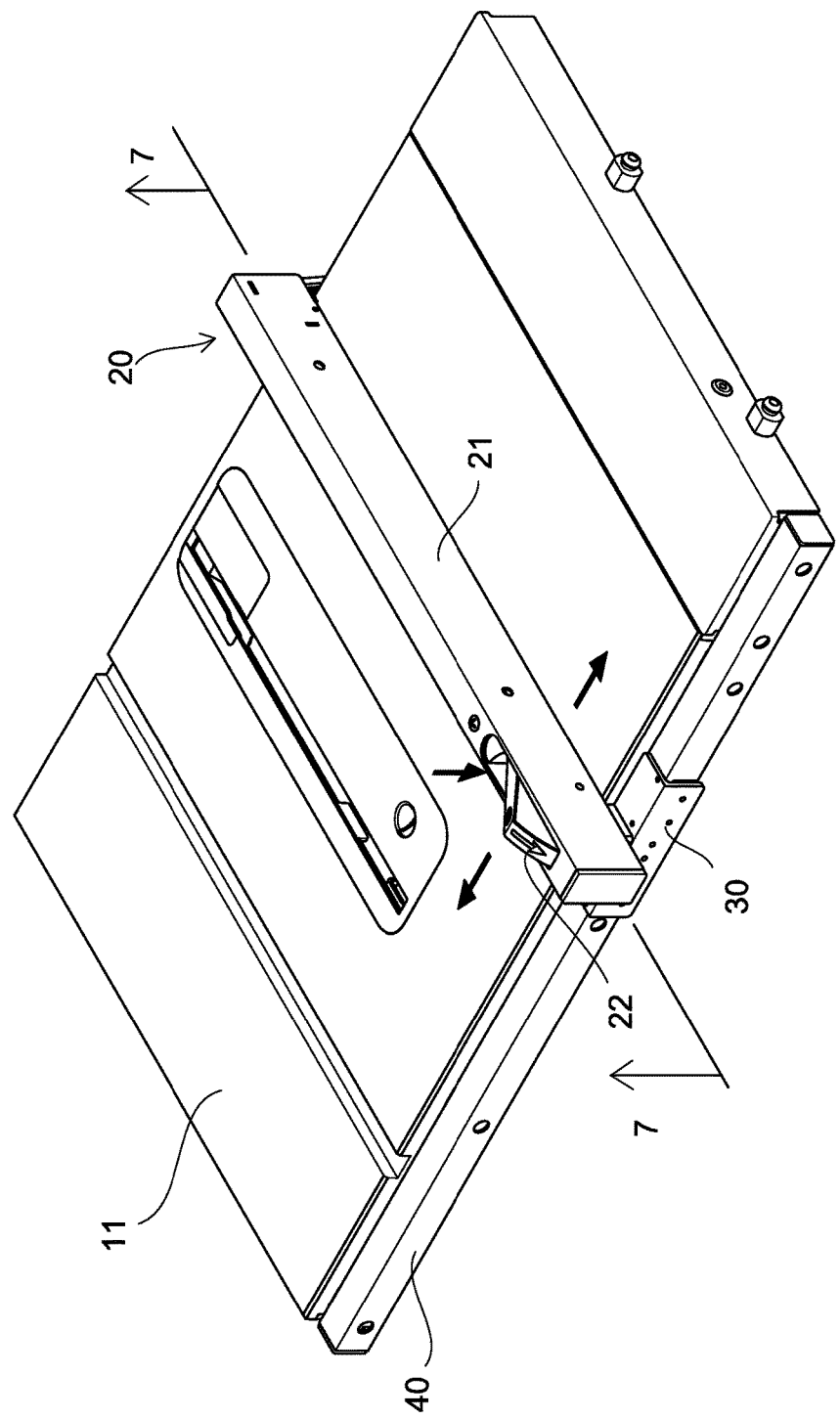
FIG. 3 is a view similar to FIG. 2 showing a pressing of the lever to unlock the rip fence.
Figure 4:
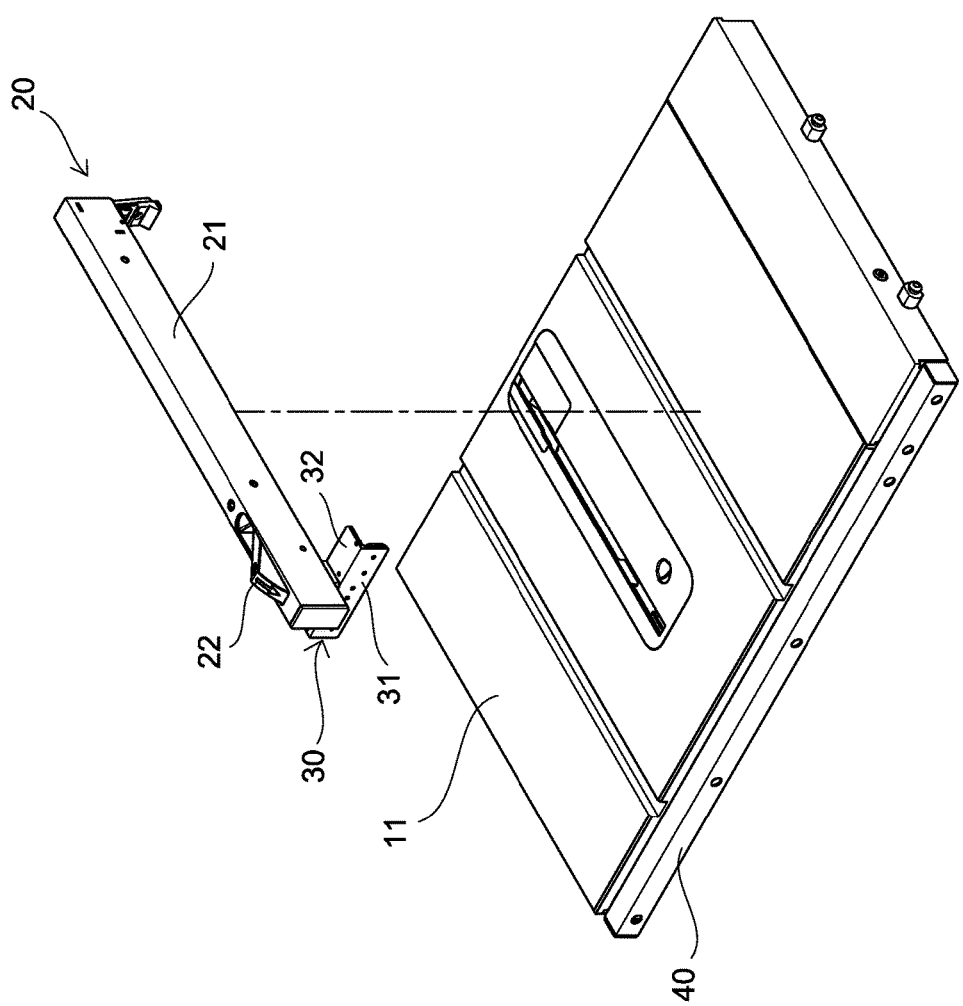
FIG. 4 is an exploded, perspective view of FIG. 3.
Figure 5:
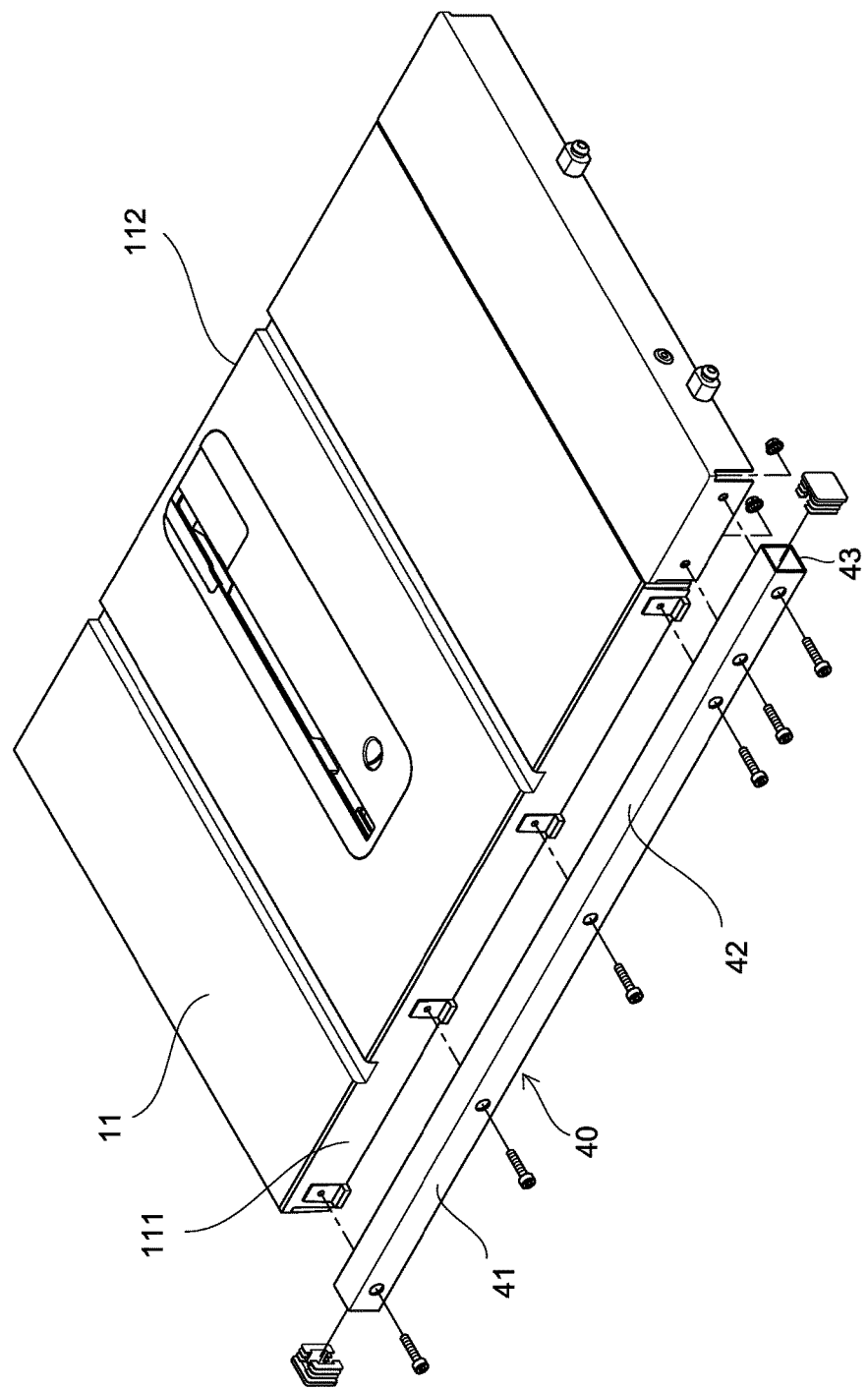
FIG. 5 is an exploded, perspective view of the cutting surface of FIG. 4.
Figure 6:
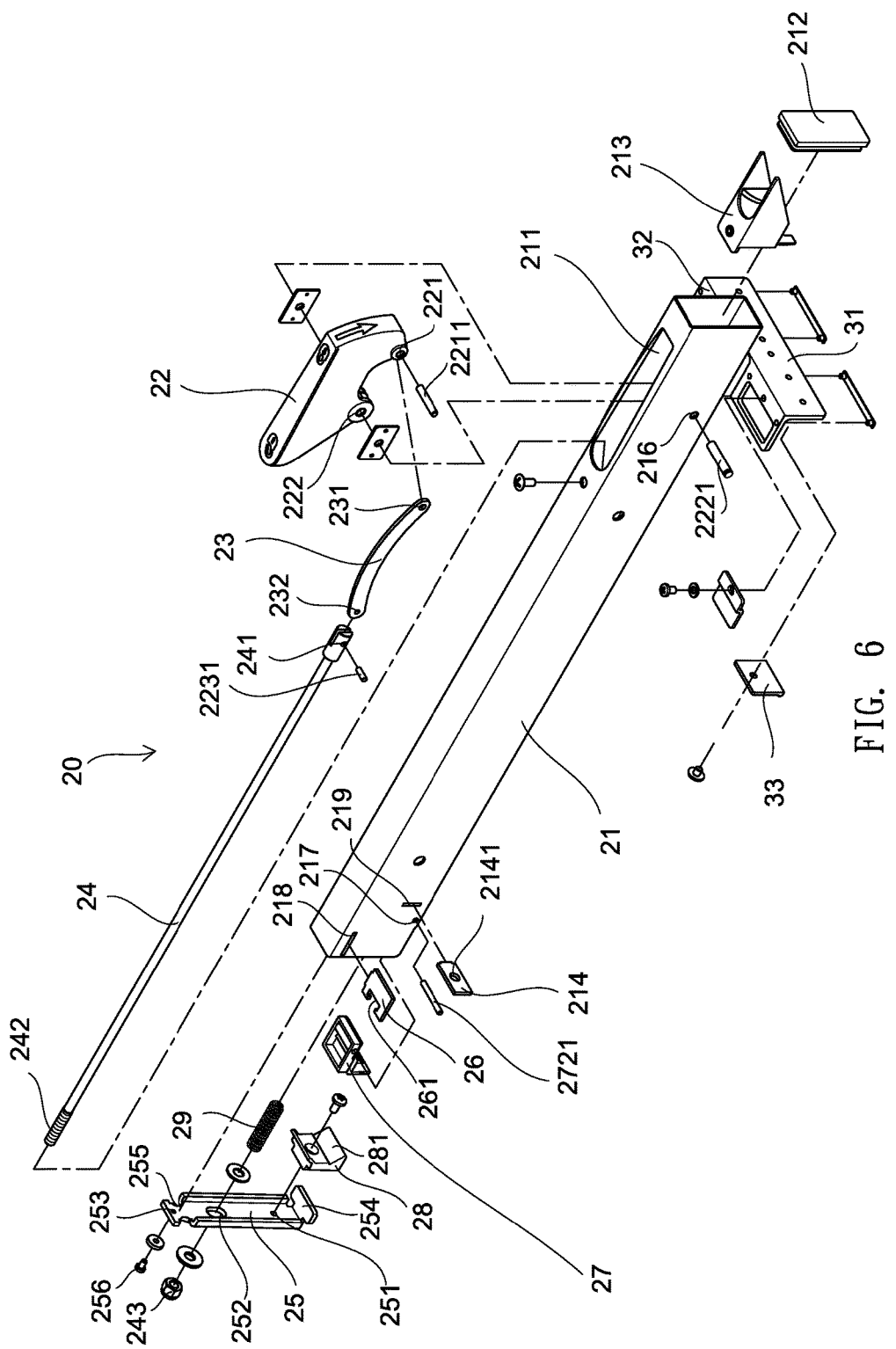
FIG. 6 is an exploded view of the rip fence.
Figure 7:
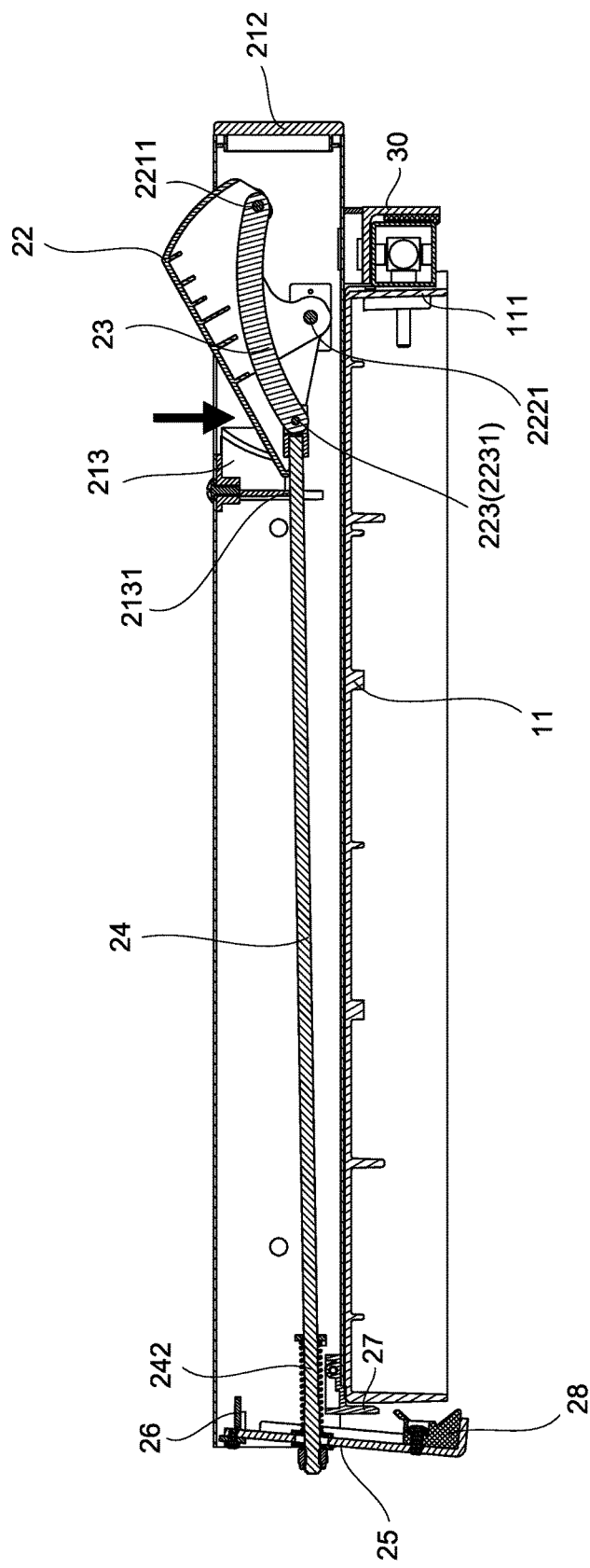
FIG. 7 is a sectional view taken along line 7-7 of FIG. 3.
Figure 7A:
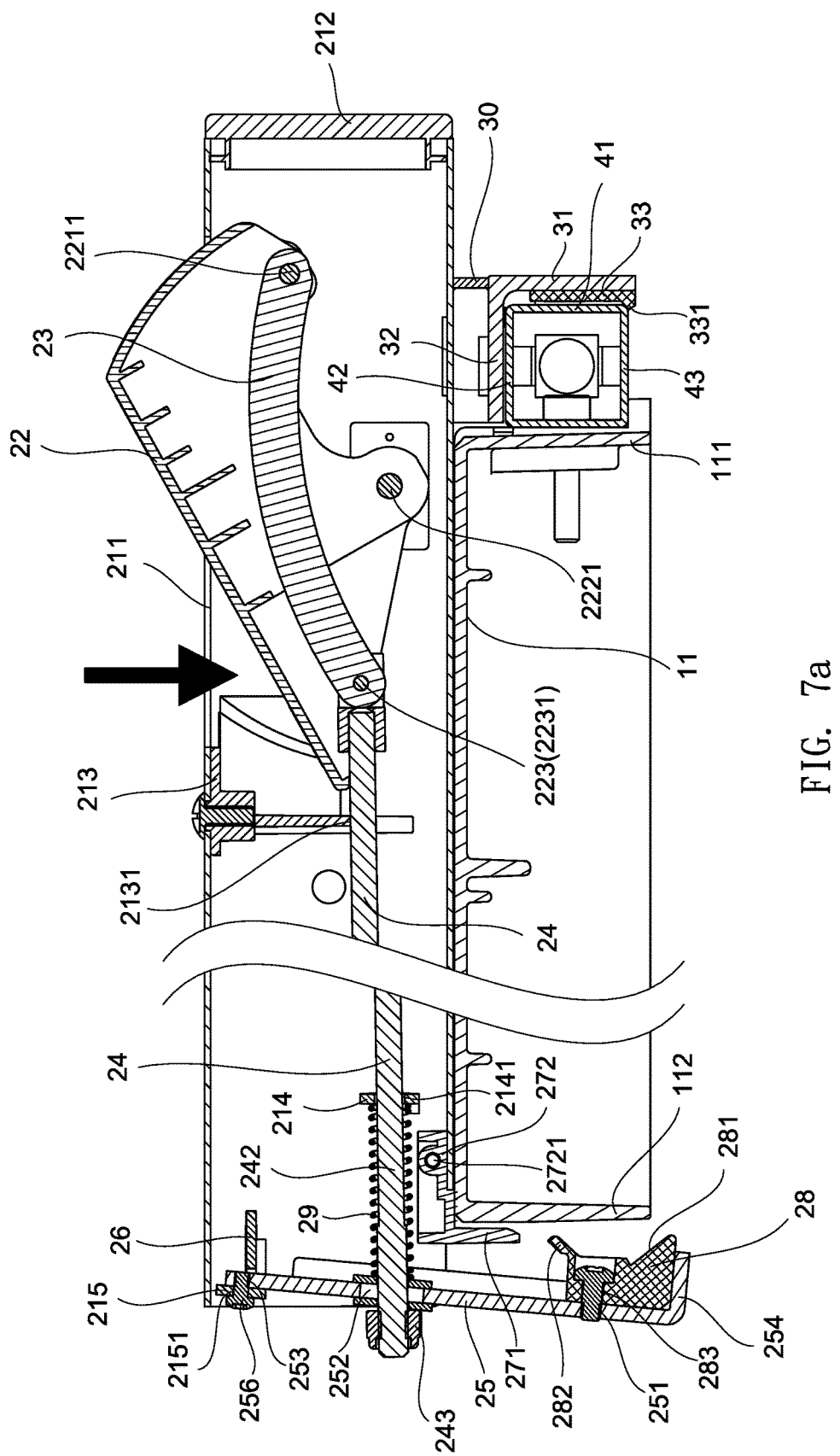
FIG. 7a is an enlarged view of two ends of the rip fence of FIG. 7.

As shown in FIGS. 3, 4, 7 ad 7a, an employee may press a portion of the lever 22 between the second through hole 222 and its rear end as indicated by arrow in FIG. 7 or FIG. 7a to cause the lever 22 to counterclockwise pivot about the pin 2221. And in turn, the rod 24 moves rearward to slightly expand the torsion spring 29, push the clamping member 25 slightly rearward, disengage the inclined member 282 from the rear end 112 of the cutting surface 11, and disengage the wedge member 281 from the bottom of the rear end 112 of the cutting surface 11. As such, the rip fence 20 is unlocked. Thereafter, the employee may slide the rip fence 20 transversely along the cutting surface 11 prior to cutting.

Figure 8:
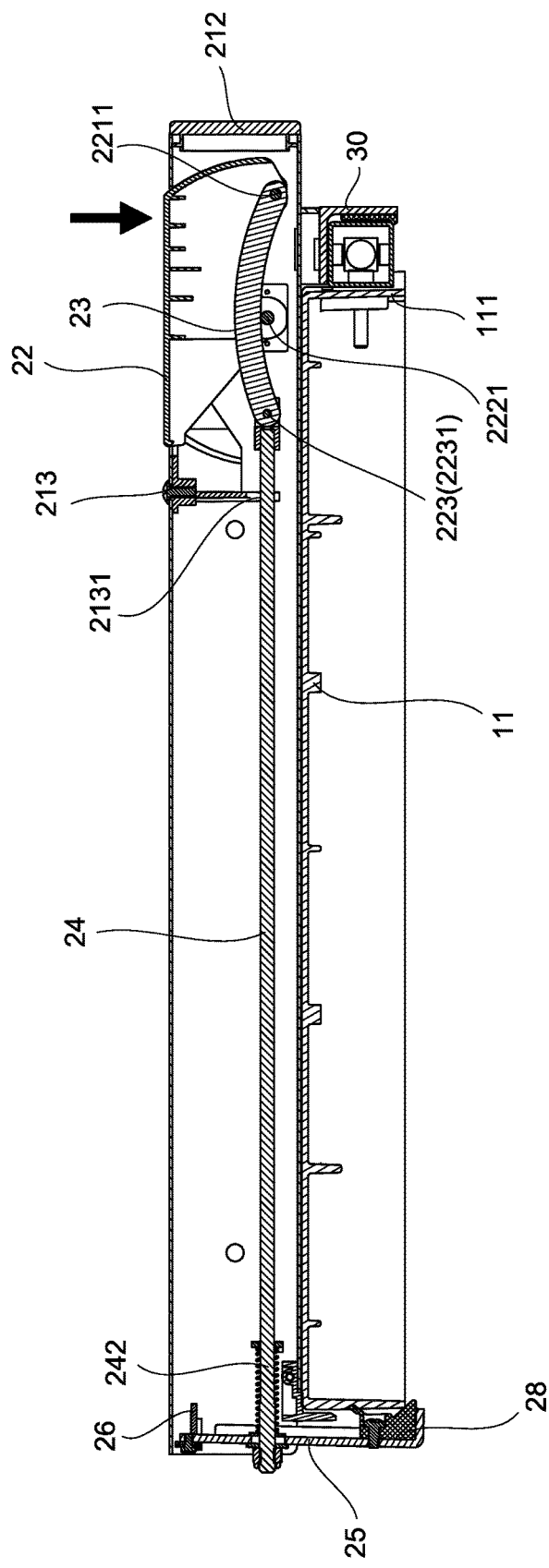
FIG. 8 is a view similar to FIG. 7 showing the lever pressed down to lock the rip fence.
Figure 8A:
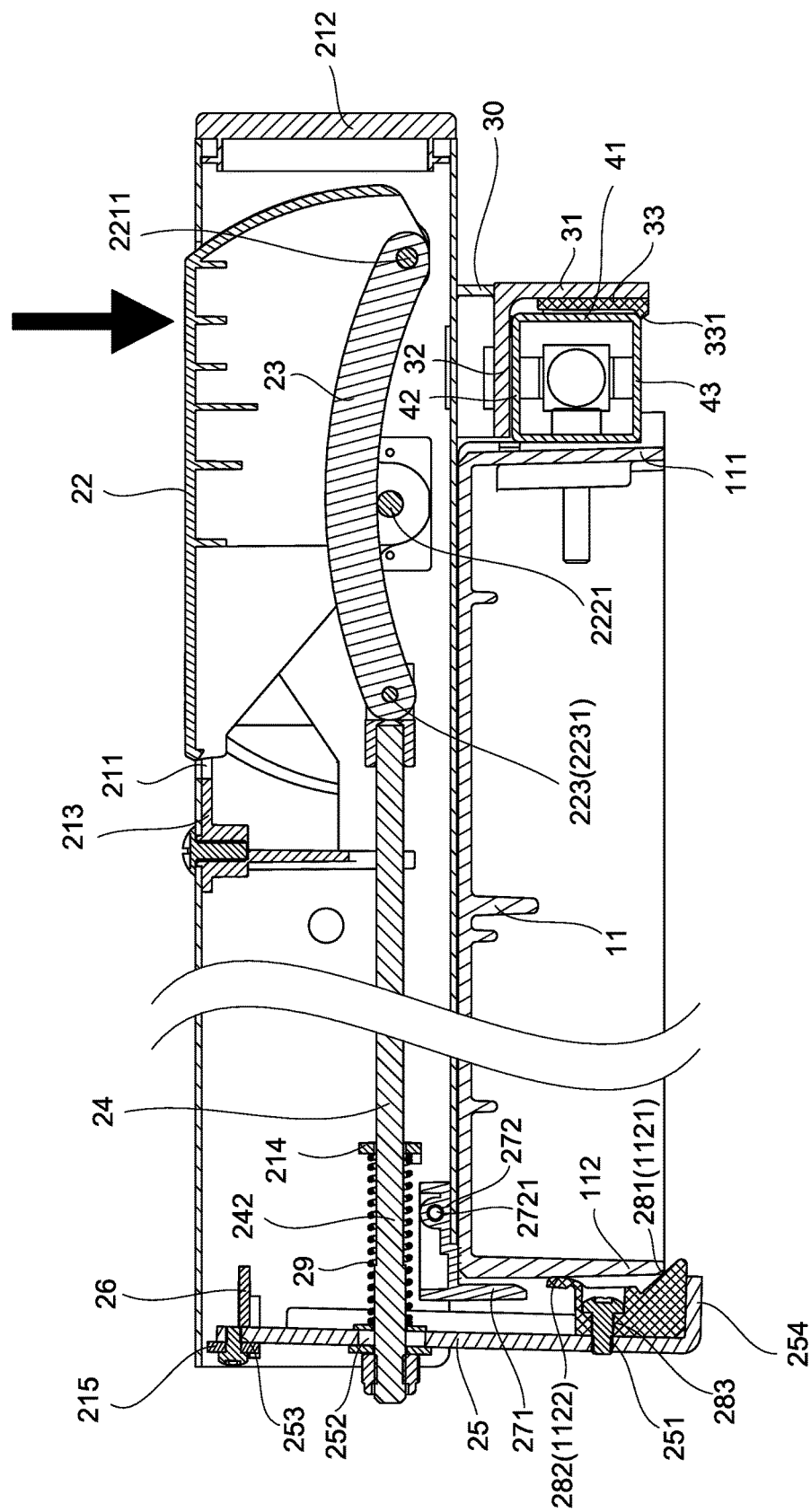
FIG. 8a is an enlarged view of two ends of the rip fence of FIG. 8.

After cutting, the employee may press a portion of the lever 22 between the second through hole 222 and its front end as indicated by arrow in FIG. 8 or FIG. 8a to cause the lever 22 to clockwise pivot about the pin 2221, thereby returning the rip fence 20 to its locked, inoperative position.

While the invention has been described in terms of preferred embodiments, those skilled in the art will recognize that the invention can be practiced with modifications within the spirit and scope of the appended claims.

What is claimed is:

1. A table saw, comprising:
a base including an upper cutting surface through which a blade extends;

a folding leg assembly for supporting the base;

a rip fence slidably mounted on the cutting surface;

a front rail mounted on a front end of the upper cutting surface; and a sliding member slidably mounted on the front rail and secured to a bottom of a front end of the rip fence;

wherein the rip fence comprises:

a housing including an elongated opening on a top adjacent to a front end, a seat secured to an underside of the top of the housing, the seat having a lower through hole, a stop member disposed across two sides of the housing, the stop member having a central through hole, and two opposite slots at a rear end of the housing;

a lever pivotably secured to the housing and disposed in the elongated opening;

a link having a front end pivotably secured to a front end of the lever;

a rod having a front end pivotably secured to a rear end of the link, the rod including external threads at a rear end, the rod passing through the through hole of the stop member;

an inverted L-shaped limit member secured across two sides of the housing, the limit member being in close proximity to an outer surface of a rear end of the cutting surface;

a support member positioned across the slots and including a rectangular recess on a rear end;

a clamping member including two opposite upper cavities secured to the recess, an intermediate hole member, and a base member projecting out a bottom of the clamping member and being perpendicular thereto wherein the rod further passes through the hole member to have the external threads fastened by a fastener, thereby securing the rod to the clamping member;

a locking member including a lower wedge member rested on the base member, and a flexible inclined member on a top wherein the locking member is secured to the clamping member; and a biasing member put on a portion of the rod between the hole member and the stop member and compressed therebetween;

wherein in a locked position the lever is flush with the top of the housing, a bottom of the rear end of the cutting surface is urged against the wedge member, the inclined member is bent to urge against the outer surface of the rear end of the cutting surface, the biasing member is further compressed, and the clamping member is disposed in a position about perpendicular to the rod;

wherein a pressing of a rear portion of the lever causes the lever to pivot in a first direction so as to move the rod rearward to expand the biasing member, push the clamping member rearward, disengage the inclined member from the rear end of the cutting surface, and disengage the wedge member from the bottom of the rear end of the cutting surface, thereby unlocking the rip fence; and wherein a pressing of a front portion of the lever causes the lever to pivot in a second direction so as to return the lever to the locked position.

2. The table saw of claim 1, wherein the front rail is hollow and has a rectangular longitudinal section, the front rail includes a top, a bottom, and two sides; and wherein the sliding member has an inverted L-shaped longitudinal section and includes a vertical part, a horizontal part in close proximity to the top of the front rail, a spacer member secured to an inner surface of the vertical part of the sliding member and in close proximity to the front one of the sides of the front rail, the spacer member having a protuberance engaged a corner of the bottom of the front rail.

3. The table saw of claim 2, wherein a distance between a vertical part of the limit member and the spacer member is greater than that between the rear end of the cutting surface and the front one of the sides of the front rail.

4. The table saw of claim 1, further comprising a fastening member having a central hole, and a fastener driven through the central hole of the fastening member to fasten a top of the clamping member and the support member together.

5. The table saw of claim 1, wherein the lever includes a first through hole on a bottom and a second through hole on the bottom and spaced from the first through hole; the curved link includes a first hole at a front end and a second hole at a rear end; further comprising a first pin driven through the first through hole and the first hole to pivotably fasten the curved link and the lever together; further comprising a second pin driven through the fifth holes and the second through hole to pivotably fasten the housing and the lever together; the rod includes a through hole at a slotted front end and external threads at a rear end wherein the rod passes through the third hole of the stop member; and further comprising a third pin driven through the through hole and the second hole to pivotably fasten the curved link and the rod together.

6. The table saw of claim 1, wherein the limit member further comprises a through hole in a horizontal part, and further comprising a fourth pin driven through the sixth holes and the through hole to fasten the housing and the limit member together.

* * * * *